United States Patent [19]  
Melugin et al.

[11] 3,946,205  
[45] Mar. 23, 1976

[54] DOCUMENT FEED FOR OPTICAL SCANNER

[75] Inventors: Leland A. Melugin, Plantation; Joseph Parchesky, Coconut Creek, both of Fla.

[73] Assignee: Datatype Corporation, Miami, Fla.

[22] Filed: July 22, 1974

[21] Appl. No.: 490,809

[52] U.S. Cl. ...... 235/61.11 E; 235/61.11 R; 360/81
[51] Int. Cl.². G06K 13/26; G06K 7/10; G11B 5/86
[58] Field of Search 178/7.6; 340/146.3 H, 146.3 F; 235/61.11 E, 61.11 R, 61.11 D; 274/4; 271/52; 250/568, 569, 570

[56] References Cited
UNITED STATES PATENTS

| | | | |
|---|---|---|---|
| 3,201,512 | 8/1965 | Mason | 235/61.11 E |
| 3,331,947 | 7/1967 | Johnson | 235/61.11 D |
| 3,501,623 | 3/1970 | Robinson | 235/61.11 E |
| 3,583,709 | 6/1971 | Dollenmayer | 274/4 |
| 3,600,557 | 8/1971 | Zappia | 235/61.11 E |
| 3,639,730 | 2/1972 | Higginbotham | 235/61.11 E |
| 3,670,099 | 6/1972 | Oliver | 178/7.6 |

Primary Examiner—D. W. Cook  
Assistant Examiner—Robert M. Kilgore  
Attorney, Agent, or Firm—Jenkins, Hanley & Coffey

[57] ABSTRACT

In a system for optically scanning and reading data printed in transversely extending lines longitudinally spaced apart on a document and comprising a scanning head including an electro-optical arrangement for scanning and reading the data, friction drive rollers for engaging and moving the document longitudinally past the scanning head, a motor drivingly connected to the rollers, and controls for the motor, the improvement in which the motor is a stepper motor having an output shaft which is advanced one step about its axis each time the motor is pulsed. The controls include a pulse generator, an optical system for detecting such lines of data on the document and stopping the longitudinal movement of the document, the optical system being operatively connected to the generator and effective to control the pulse output of the generator. The generator preferably provides pulses at a first predetermined frequency and pulses at a second and lower frequency. The controls include a speed selector circuit for selecting which of the first and second frequency pulses are to be fed to the motor. The optical system which finds the lines of data on the document controls the selector to switch the selector to the second and lower frequency pulses when the field of view of the optical system crosses the leading edges of the line of data to be read, thereby slowing the stepping speed of the motor. The controls also include circuitry responsive to the output of the line-find optical system to stop the pulsing of the motor and thereby to stop the longitudinal movement of the documents when the field of view crosses the trailing edge of a line of data. Other inputs are provided to the controls to control the speed selector.

15 Claims, 6 Drawing Figures

DOCUMENT FEED FOR OPTICAL SCANNER

The present invention relates to document feeders and more particularly to the provision of a system for optically reading data printed in transversely extending lines longitudinally spaced apart on a document and means for feeding the document longitudinally past a scanning head including electrooptical means for scanning and reading data.

Reference is made to U.S. Pat. Nos. 3,600,557; 3,639,730 and 3,738,643, all of which are assigned to the assignee of the present application, and the various patent references cited therein. Reference is made also to the pending application Ser. No. 401,935 filed Sept. 28, 1973, now U.S. Pat. No. 3,857,020, also assigned to the same assignee. These prior U.S. patents disclose the type of data reader with which the present invention is ideally used to feed a document longitudinally past a transversely reciprocable scanning head, the document having a plurality of longitudinally spaced apart, transversely extending lines of data typed or printed thereon. As clearly described in U.S. Pat. No. 3,600,557, the bar code data to be read may be placed upon the documents or sheets of paper by using typewriters which are modified to provide, as well as conventional letters or symbols, a bar code representing the letters or symbols. Preferably, each type carrier or type ball will be modified so that there will be printed below each character (letter or symbol) marks which can be read by optical scanning.

In such apparatus as disclosed in the above-said U.S. patents, two basic drive systems are involved, one for driving the document longitudinally past the transversely movable scanning head and the other to reciprocate the scanning head. In order to produce a viable data reader, it is necessary to drive both the document and the scanning head at high speed to provide a sufficient output of the reader.

The U.S. Pat. No. 3,639,730 discloses one system for moving the document longitudihally under the scanning head. That system has worked well in the past and is still working well. The system includes a continuously running motor which is drivingly connected to the friction drive rollers by means of electrically-operated clutch means and brake means. When the line-find optics finds a line of data to be read, the clutch means is disengaged to break the driving connection between the motor and the feed rollers while the brake means is engaged quickly to stop the document so that the line of data is accurately under the scanning head. This requirement, of course, is of extreme importance. The accuracy with which a document can be stopped from its high-speed movement, for instance, 3.13 inches per second, is an important factor in determining the height of the bar code to be scanned. Because of the accuracy of the very much improved system of the present invention, and because of the automatic line tracking feature disclosed in the said patent application Ser. No. 401,935, the bar code need only be 0.035 inch tall.

The type of motor used in the system of the present invention is preferably a stepper motor having an output shaft which is advanced one step about its axis each time the motor is pulsed. At full speed, for instance, the motor may be pulsed at a frequency of 1,333 cycles per second. At half speed or slow speed, the motor may be pulsed at half that frequency. Each time the motor is pulsed, its output shaft moves 1.8° about its axis. Gear reduction means is provided for drivingly connecting the output shaft to the friction drive rollers such that each step of the motor amounts to a 0.36° step of the drive rollers.

Since the stopping accuracy of the feed system is very important, the present invention provides means for slowing the motor stepping rate down to one-half its full speed stepping rate just before it is necessary to stop the document to scan a line. The manner in which the motor is slowed down initially by the optical means for detecting lines of data and then subsequently stopped will be discussed in detail hereinafter.

It is an object of the present invention, therefore, to provide, in such a data reader, the improvement in which the motor is a stepper motor having an output shaft which is advanced one step about its axis each time the motor is pulsed, the control means including means for generating motor energizing pulses, and optical means for detecting lines of data on the document and stopping the longitudinal movement of the document. The optical means is operatively connected to the generating means and effective to control the pulse output of the generating means. The generating means preferably includes means for providing pulses at a first predetermined frequency and pulses at a second and lower frequency, and a speed selector circuit for selecting which of the first and second frequency pulses are to be fed to the motor.

Another object of the present invention is to provide such an improvement in which the control means includes means for operatively connecting the optical means to the selector circuit, the optical means defining a field of view and including light-responsive means for providing an output effective to switch the selector circuit to the second and lower frequency pulses when the field of view crosses the transversely extending leading edge of a line of data to be read, thereby slowing the stepping speed of the motor. Then, the control means includes means responsive to the output of the light responsive means to stop the pulsing of the motor and thereby to stop the longitudinal movement of the document when the field of view crosses the transversely extending trailing edge of a line of data.

Another object of the present invention is to provide such an improvement in which the motor includes a plurality of coils which are sequentially energized to move the motor output shaft each step, the control means including a ring counter having a plurality of outputs associated respectively with the coils, a driver for connecting each ring counter output to its associated motor coil, and circuit means for connecting the selector circuit to the ring counter.

In the preferred system of the present invention, the motor is always started by the selector circuit at the slower stepping rate, and a slow speed time-out circuit is provided and effective to switch the selector circuit to the faster stepping rate a predetermined time after the motor is started at its slower stepping rate.

Other objects and features of the present invention will become apparent as this description progresses.

To the accomplishment of the above and related objects, this invention may be embodied in the form illustrated in the accompanying drawings, attention being called to the fact, however, that the drawings are illustrative only, and that changes may be made in the specific construction illustrated and described, so long as the scope of the appended claims is not violated.

Figure 1:
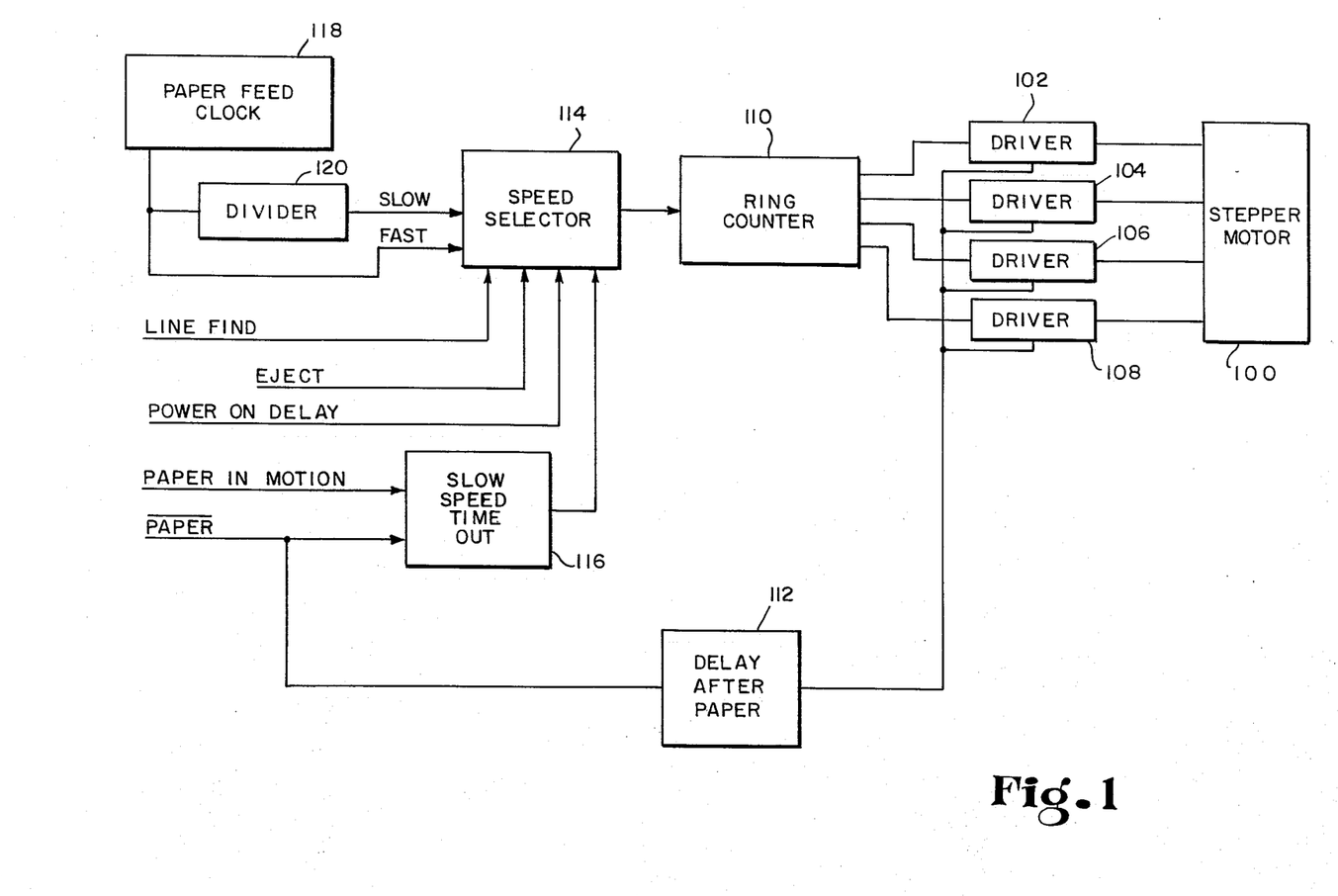
FIG. 1 is a block diagram of the system of the present invention.

Referring now specifically to the block diagram of FIG. 1, it will be seen that the stepper motor is indicated generally by the reference numeral 100 while each of the four drivers (driver transistors) for the four coils of the motor are indicated respectively by the reference numerals 102, 104, 106, 108. The four drivers are energized in pairs sequentially by the ring counter 110 when a delay after paper circuit 112 is in proper condition. There is a speed selector circuit 114, a slow speed time out circuit 116, a paper feed clock or oscillator 118, and a pulse divider or frequency divider 120.

Figure 2A:
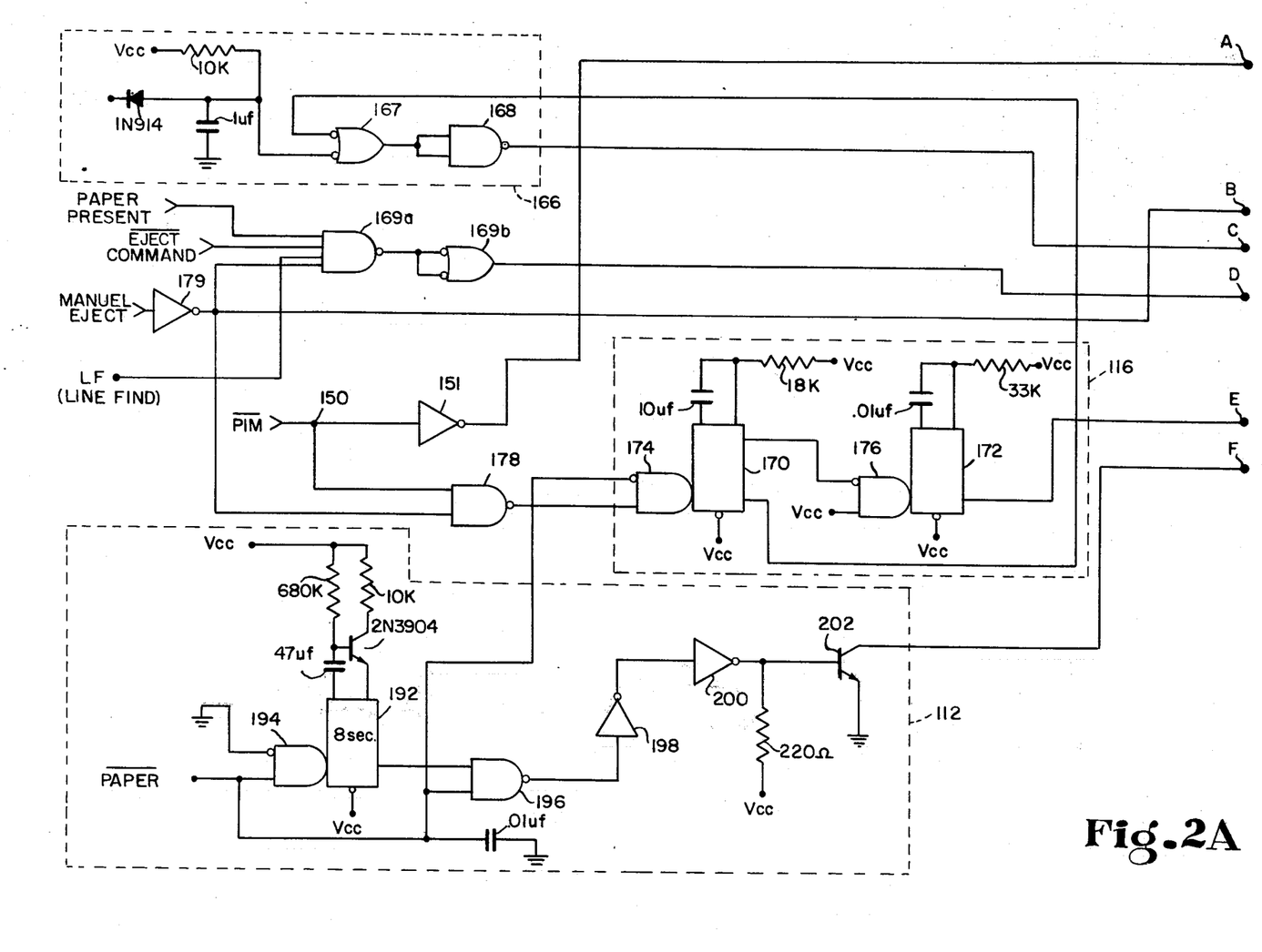
FIG. 2 is a logic diagram of the system of the present invention including FIGS. 2A and 2B with the connections between the two FIGS. being made at the terminals indicated A–F.
Figure 2B:
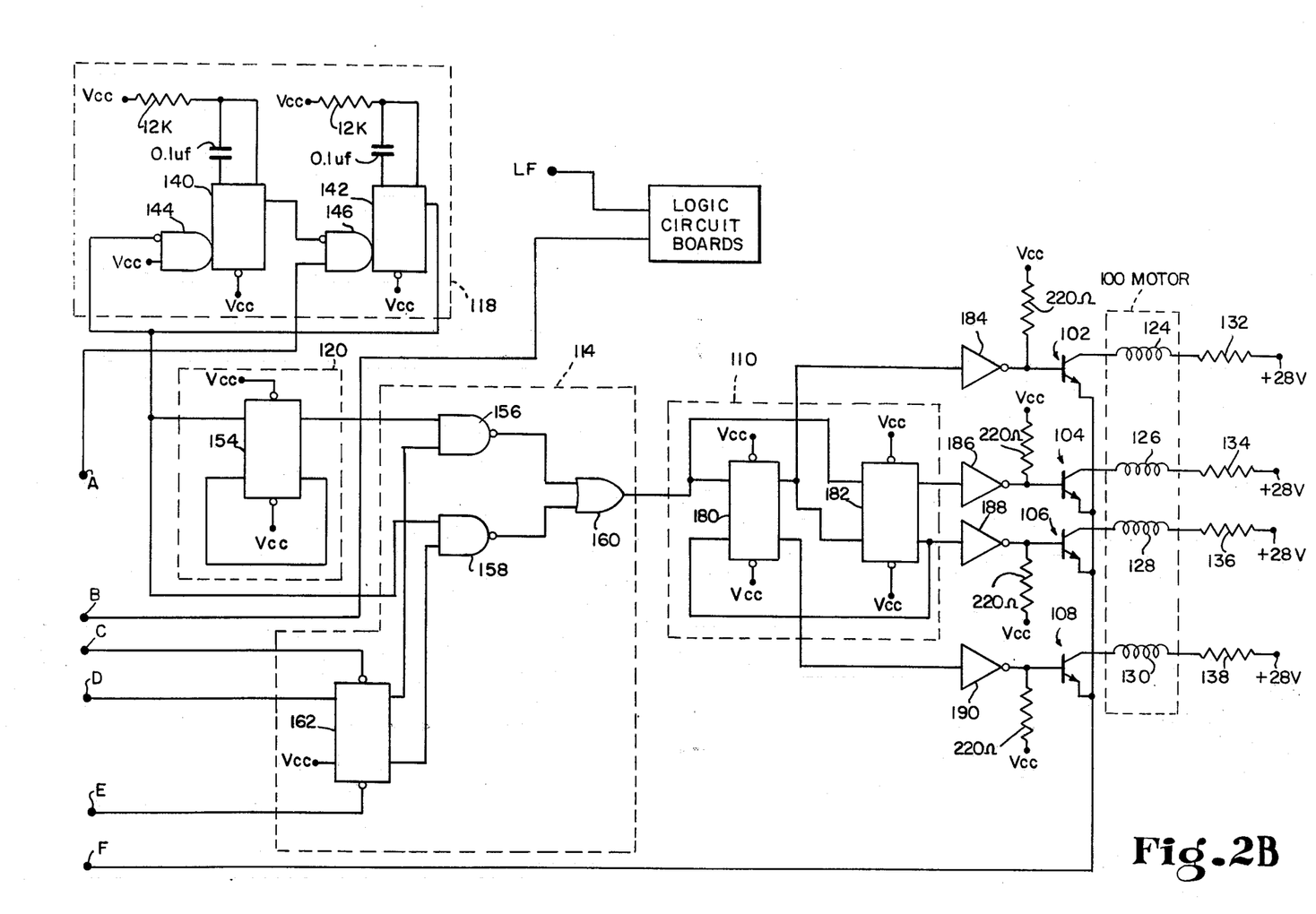

Turning now to FIG. 2, it will be seen that the motor 100 is shown with four coils 124, 126, 128, 130 with a resistor 132, 134, 136, 138 connected in series with each coil and between the coil and the positive 28 volt input terminal. The other side of each coil 124 – 130 is connected to the collector of its driver transistor 102, 104, 106, 108. The emitter of each driver transistor 102 – 108 is connected through another transistor 202 which comprises a part of the delay after paper circuit 112 to ground or the negative 28 volt source. Thus, when the transistor 202 is conducting each of the coils 124 – 130 can be energized by current flow from its respective positive 28 volt terminal when its driver transistor 102 – 108 is switched to its conductive state by an output from the ring counter 110. The ring counter 110, which will be discussed in detail hereinafter, provides its sequencing output when it receives pulses originating initially in the paper feed clock circuit 118 which, in the illustrative embodiment, comprises a pair of one shots 140, 142, each having its own input gate 144, 146. Basically, in the illustrative embodiment, the two one shots 140, 142 are wired back-to-back to oscillate at 1,333 cycles per second. That oscillation occurs when the document being read is in motion, and the paper feed clock 118 is controlled by a logic signal called paper in motion (PIM) applied to terminal 150 and processed through an inverter 151 to the input 146 for the one shot 142. When the PIM is at a high voltage level, the paper is in motion because the oscillator is on and when the PIM is at a low level, the paper is stopped, for instance, for document reading by the optical scanner. The paper feed clock circuit 118, therefore, is a controlled source of output pulses.

The divider 120 which, in the illustrative embodiment comprises a flip-flop 154, divides the pulse rate from the clock by one-half to provide a slower pulse rate for stepping the motor 100. In other words, in the illustrative and preferred system, because of the divider 120, there are two pulse rates, one for fast movement of the motor and one for slower movement of the motor.

Then, the speed selector circuit 114 is provided for selecting which of the two pulse rates is to be fed to the motor 100, the illustrative selector circuit 114 comprising a pair of control Nand gates 156, 158, a Nor gate 160 and a flip-flop 162. Each Nand gate 156, 158 is, of course, an inverted And gate which will provide an output if it has a logic "1" on both of its inputs, the output being an inverted "1" or a logic "0". The Nor gate 160 is an inverted Or gate which will provide a logic "1" output when there is a logic "0" on either of its inputs. One output of the flip-flop 154 of the divider 120 is fed directly to the Nand gate 156 while the output of the clock 118, i.e., its high pulse rate, is fed directly to an input of the Nand gate 158. The flip-flop 162 provides two outputs which are fed respectively to the two Nand gates 156, 158. Thus, the condition of the flip-flop 162 determines which of the two Nand gates 156, 158 will be operative i.e., whether a fast pulse rate or a slow pulse rate will be supplied to the motor 100.

The condition of the flip-flop 162 is determined by, or may be determined by, a plurality of inputs. There is an input representing PAPER PRESENT, another input representing EJECT COMMAND, another input representing MANUAL EJECT, another input representing POWER ON DELAY, and finally, another input representing LINE FIND. These input and the manner in which they may be obtained are discussed in the said prior U.S. Pat. Nos. 3,600,557; 3,639,730; and 3,738,643. As will be more fully discussed hereinafter, these inputs to the flip-flop 162 are effective to cause the motor 100 to be fed the slower pulse rate for slower stepping when the system is being started up, when a line is first located to be read, when the document is first being advanced to a new line, etc. The power on delay circuit 166 which, in the illustrative embodiment includes a pair of gates 167, 168, provides an output to the flip-flop 162 so that the motor 100 will always start at its slower rate. That is, the circuit 166 keeps the flip-flop 162 in a condition such that it will always cause the motor to be started at its slower pulse rate. The other logic inputs and command signals applied to the flip-flop 162, in the illustrative embodiment, are fed through gates such as indicated at 169a, 169b to the flip-flop 162.

The slow speed time out circuit 116, in the illustrative embodiment, comprises one shots 170, 172 with their respective inputs 174, 176. The circuit 116 basically is a one shot delay circuit which resets the speed selector 114 flip-flop 162 to the fast mode or full pulse rate after a predetermined time period for starting up. The circuit 116 permits movement of the motor 100 at the slower pulse rate for ten pulses. The one shot 170 provides an output of one pulse which is a ten millisecond pulse giving a ten millisecond delay. The second one shot 172 reacts to the end of that ten millisecond pulse to provide a signal which will flip the condition of the flip-flop 162 to provide a logic "1" on both inputs of the Nand gate 158. The circuit 116 gets its starting signal from the PIM terminal 150 through a gate 178 or from the MANUAL EJECT input through a gate 179 and the gate 178.

With the above description of how the ring counter 110 is pulsed, it can be seen that the illustrative ring counter includes a pair of flip-flops 180, 182, the four outputs of which are connected respectively to open collector inverters 184, 186, 188, 190. The inverters 184 – 190 are connected respectively to the base electrodes of the driver transistors 102, 104, 106, 108.

Finally, after a document has been fed completely through the machine, the motor will continue to operate for a short period of time so that another document can be fed into the machine to be scanned. This is accomplished by the delay after paper circuit 112 which, in the illustrative embodiment, includes a one shot 192 with its input 194 connected to the device which provides a signal when paper is present. When a paper is not present, that input to the one shot 192 will provide an 8 second output from the one shot which is fed through gates 196, 198, 200 to a transistor 202 which was discussed previously and which connects the emitter electrodes of transistors 102, 104, 106, 108 to ground or to the negative 28 volt source. When the transistor 202 is not conducting, of course, the coils of the motor 100 cannot be energized to drive the motor.

Figure 3:
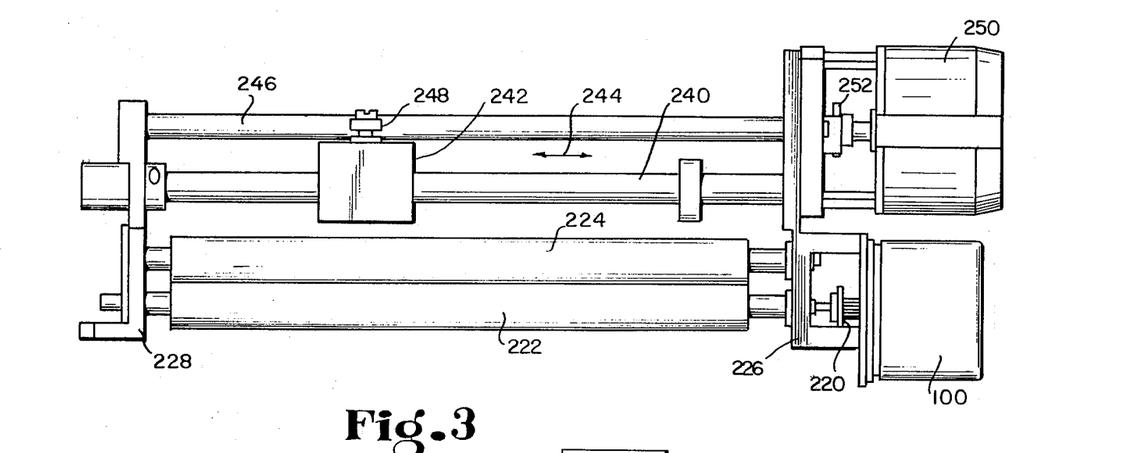
FIG. 3 is an elevational view of the friction drive roller and motor arrangement.

The motor 100 may be, for instance, a motor such as the RAPID-SYN STEPPER motor manufactured and sold by Computer Devices Corp., 11925 Burk St. Santa Fe Springs, Cal. 90670 which is a 4-phase, bi-filar, 1.8° low inertia motor which includes the 4-phase coil windings as shown in the drawings. In the illustrative embodiment, that 1.8° stepping motor is geared down by a gear 220 so that each step of the motor 100 produces a 0.36° step of the document feed roller 222 (FIG. 3). The feed roller 222 is proportioned such that the full speed stepping of the motor 100 moves the document 3.13 inches per second while the half-speed stepping of the motor moves the document 1.5 inches per second. The motor 100 can be very accurately started and stopped at the slower pulse rate provided by the speed selector circuit 114, but it cannot be so accurately stopped at the faster pulse rate, i.e., the full rate provided by the clock circuit 118. In fact, because of the motor design, it cannot be started usually at the faster pulse rate. As pointed out previously, accurate stopping of the longitudinal document feed so that a transversely extending line of data can be scanned is of extreme importance.

Referring further to FIG. 3, the relationship of the motor 100 and the document feed roller 222 will be discussed. Reference is made to the aforesaid U.S. pat. No. 3,639,730 which shows document feed rollers 22, 24 driven by a continuously running electric motor 28 through electrically operated clutch means and brake means 30, 32. In the present invention, the stepping motor 100 replaces the earlier continuously running motor and clutch and brake means. The present system does include an upper roller 224 which idles against the drive roller 222. The paper document is gripped between and moved by the rollers 222 and 224. The two rollers 222, 224 are journalled at their ends in frame brackets 226, 228 while the motor 100 is mounted on the bracket 226 by conventional techniques.

Above and parallel with the rollers 222, 224 is a transversely extending cylindrical rod 240 upon which a block 242 is mounted for transverse reciprocation in the direction of the arrow 224. Above that rod 240 is another rod 246 which is engaged by roller bearings 248 mounted on the block 242. Such a structure is shown in the U.S. Pat. No. 3,639,730. In the aforesaid patent application Ser. No. 401,935 filed Sept. 28, 1973 by Roy F. Higginbotham et al, an automatic line tracker is disclosed. That device includes a motor 250 and cam 252 which shifts the rod 246 to tilt the block 242 about the axis of the rod 240 to track the bar code line being scanned.

Figure 4:
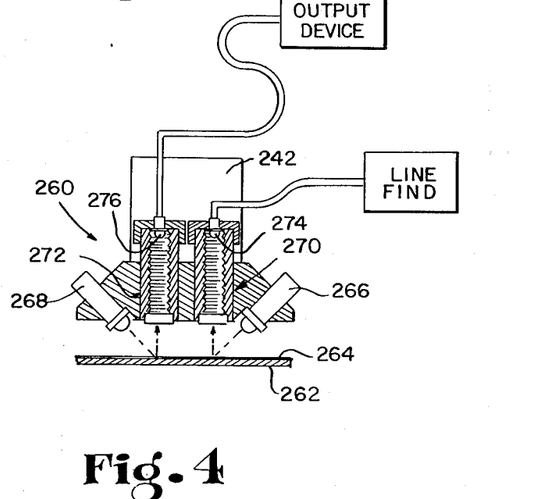
FIG. 4 is a diagrammatical view of the optical scanning head including the line-find optics.

Mounted upon the block 242 is a scanning head of the type generally shown in the said prior patents, for instance, in FIG. 3, of U.S. Pat. No. 3,639,730 as well as in FIGS. 3 and 7 of patent application Ser. No. 401,935. Such as scanning head 260 is shown diagrammatically in FIG. 4. It will be appreciated that, within the scope of the present invention, the design of the scanning head and its optics may be changed rather significantly. FIG. 4 shows a plate 262 providing an upper surface on which a document 264 is resting. The rollers 222, 224 move the document 264 longitudinally on the upper surface of plate 262. The scanning head 260 includes light sources 266, 268 for projecting light at the document 264, optics means 270, 272 for directing the light reflected from the document toward light-responsive semi-conductor devices 274, 276 which are connected respectively to the line find circuitry and an output device which processes the information being scanned. Such output devices are discussed in the said prior patents.

As discussed in the said prior patents, each line of data to be scanned may begin with a line find mark positioned adjacent the left-hand edge of the document. Such marks are shown diagrammatically in FIG. 5 and indicated by the reference numeral 10, 12, 14, 16. Extending transversely to the right from each such mark is the bar code to be read. Because of the accuracy with which the motor 100 can be stopped, the line find marks and the bar code to be scanned can be only 0.035 inch in the longitudinal direction, i.e., in the direction in which the document is fed under the scanning head as indicated by the arrow 17.

Figure 5:
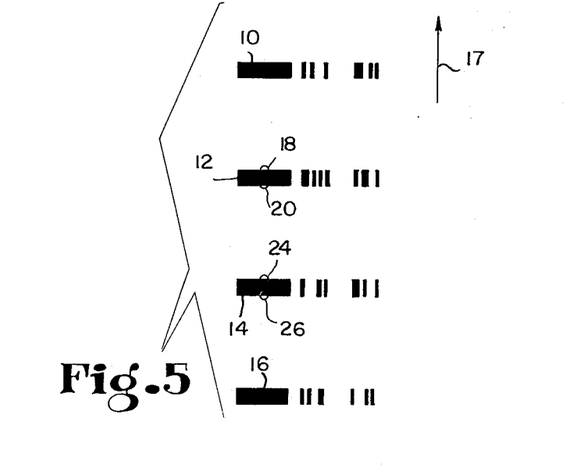
FIG. 5 is a diagrammatical view showing the manner in which the lines of data are found to stop the feeding of the document.

Assume that the data in line 10 has been read and that the document is moving at full speed, i.e., 1,333 pulses per second or steps per second, in the direction of the arrow 17. When the viewing area of the optics means 270 moves over the upper edge of the mark 12 as indicated at 18, the line find circuitry associated with the semiconductor device 274 provides an output which is effective to switch the speed selector circuit 114 over to the slow pulse rate. When the viewing area of the line find optics reaches the position indicated by the reference numeral 20, the document feed motor 100 is stopped by the control circuitry so that the scanning head 260 can be moved transversely along the line of data beginning with the mark 12. At the end of that line, the document feed is started again at the slow pulse rate until the slow speed time out circuitry 116 is effective as discussed previously to operate the speed selector circuit 114 to apply the fast pulse rate to the motor 100. Then, the document moves in the direction of the arrow 17 until the viewing area of the line find optices again reaches the upper edge of the next adjacent mark 14 as indicated by the reference numeral 24. The process is repeated to slow down the feed of the document to the slow pulse rate or stepping rate until the viewing area reaches the position indicated by the reference numeral 26 which stops the motor 100 so that the line of data beginning with the mark 14 can be scanned.

In this description and in the claims appended thereto, the upper edges of such marks 10, 12, 14 16 are the leading edges of lines of data to be read and the lower edges are trailing edges of the lines to be read.

In recapitulation to this point, the motor 100 is pulsed or stepped at the lower rate when its starts to move the document, moves at that slow speed until the circuit 116 provides an output, then it moves at the higher speed until the line find optics finds the upper edge of a start mark, and then moves at the slower speed so that the document can be stopped accurately when the viewing area of the line find optics is at the bottom edge of the start mark. The motor 100, in the illustrative and preferred system, is always started at the slow stepping rate because of the power on delay circuit 166 which provides an input to the flip-flop 162. After a document has been fed through the machine, the circuit 112 will keep the motor driving or stepping at the full pulse rate for approximately ten seconds or until a new document is placed in the machine. When the new document is placed in the machine, the motor 100 is slowed initially to its slow stepping rate for ten steps or so. Thereafter, the document is driven at the full speed until the viewing area of the line find optics arrives at the upper edge of the uppermost mark starting a line to be scanned.

The manner in which the clock 118 is stopped to stop the motor 100 when a line is found, i.e., when the field of view of the line-find optics crosses the trailing edge of a mark, will now be discussed. The output of the light-responsive means 274 is connected to the terminal LF shown in FIG. 2. That terminal LF is connected as an input to gate 169a and through that gate 169a and gate 169b to the flip-flop 162 to slow the pulse rate fed to the motor 100 when the field of view crosses the leading edge of a line mark. The terminal LF is also connected through logic circuitry (not shown) to the terminal 150. In the illustrative system, when the field of view of the line-find optics crosses the trailing edge of a line mark, the voltage or terminal 150 goes to its high level. When terminal 150 goes high, the gate 151 conducts the signal to the input gate 146 which stops the clock 118 from generating pulses, thereby to stop the motor 100.

Thus, the clock 118 runs to generate pulses when the terminal 150 is at its low level and stops when the terminal 150 is at its high level. As soon as the terminal 150 goes low after it has been high, the clock 118 will start generating pulses. This may happen, for instance, when the scanning head 260 returns to its home position. There are some conditions where that won't happen such as, for instance, when the system receives a stop command.

It will be appreciated that the circuit elements described and illustrated in the accompanying drawings may well be conventional and commercially available circuit elements which are arranged in the unique manner shown in the drawings. A detailed description of each such element, therefore, need not be included in this description.

We claim:

1. In a system for optically reading data printed in transversely extending lines longitudinally spaced apart on a document comprising a scanning head including electro-optical means for scanning and reading data, means for supporting said scanning head for transverse movement relative to such a document and along each such line of data, drive means for moving such a document longitudinally relative to said scanning head, said drive means including friction drive roller means for engaging and moving such a document, a motor, means for drivingly connecting said motor to said roller means, and control means for said motor, the improvement in which said motor is a stepper motor having an output shaft which is advanced one step a out its axis each time said motor is pulsed, said control means including generating means for producing pulses at a first predetermined frequency and at a second and lower frequency, and a speed selector circuit operatively connected to said generating means for selecting which of said first and second frequency pulses are to be fed to said motor, and optical means for detecting lines of data on such a document and stopping longitudinal movement of such document, said optical means being operatively connected to said generating means and effective to control the pulse output of said generating means.

2. The improvement of claim 1 in which said generating means includes an oscillator for producing pulses at a first predetermined frequency, a divider circuit for receiving such pulses and providing an output of pulses at a second and lower frequency, and said speed selector circuit is operatively connected to said oscillator and said divider circuit.

3. The improvement of claim 1 in which said control means includes means for operatively connecting said optical means for detecting lines of data to said selector circuit, said optical means defining a field of view and including light-responsive means for providing an output effective to switch said selector circuit to said second and lower frequency pulses when said field of view crosses the transversely extending leading edge of a line of data to be read, thereby slowing the stepping speed of said motor.

4. The improvement of claim 3 in which said control means includes means responsive to the output of said light-responsive means to stop the pulsing of said motor and thereby to stop the longitudinal movement of said document when said field of view crosses the transversely extending trailing edge of a line of data.

5. The improvement of claim 1 including a slow speed time out circuit operatively connected to said selector circuit and effective to switch said selector circuit to the first frequency pulse output a predetermined time after the motor is started at its slower stepping rate.

6. The improvement of claim 2 in which said control means includes means for operatively connecting said optical means for detecting lines of data to said selector circuit, said optical means defining a field of view and including light-responsive means for providing an output effective to switch said selector circuit to said second and lower frequency pulses when said field of view crosses the transversely extending leading edge of a line of data to be read, thereby slowing the stepping speed of said motor.

7. The improvement of claim 1 in which said optical means defines a field of view and includes light-responsive means for providing an output effective to stop the pulsing of said motor and the movement of said document when said field of view crosses the trailing edge of a line of data to be read.

8. The improvement of claim 1 in which said motor includes a plurality of coils which are sequentially energized to move said output shaft each step, said control means including a ring counter having a plurality of outputs associated respectively with said coils, and circuit means for connecting the input of said ring counter to said generating means and the outputs of said ring counter respectively to said coils.

9. In a system for optically reading data printed in transversely extending lines longitudinally spaced apart on a document comprising a scanning head including electro-optical means for scanning and reading data, means for supporting said scanning head for transverse movement relative to such a document and along each such line of data, drive means for moving such a document longitudinally relative to said scanning head, said drive means including friction drive roller means for engaging and moving such a document, a motor, means for drivingly connecting said motor to said roller means, and control means for said motor, the improvement in which said motor is a stepper motor having an output shaft which is advanced one step about its axis each time said motor is pulse and including a plurality of coils which are sequentially energized to move said motor output shaft each step, said control means including a ring counter having a plurality of outputs associated respectively with said coils, a driver for connecting each ring counter output to its associated motor coil and including means for producing pulses at a first predetermined frequency and pulses at a second and lower frequency, and a speed selector circuit for selecting which of said first and second frequency pulses are to be fed to said motor, and optical means for detecting lines of data on such a document and stopping longitudinal movement of such document, said optical means being operatively connected to said generating means and effective to control the pulse output of said generating means.

10. The improvement of claim 4 in which said control means includes means for operatively connecting said optical means for detecting lines of data to said selector circuit, said optical means defining a field of view and including light-responsive means for providing and output effective to switch said selector circuit to said second and lower frequency pulses when said field of view crosses the transversely extending leading edge of a line of data to be read, thereby slowing the stepping speed of said motor.

11. The improvement of claim 10 in which said control means includes means responsive to the output of said light-responsive means to stop the pulsing of said motor and thereby to stop the longitudinal movement of said document when said field of view crosses the transversely extending trailing edge of a line of data.

12. In a system for optically reading data printed in transversely extending lines longitudinally spaced apart on a document comprising a scanning head including electro-optical means for scanning and reading data, means for supporting said scanning head for transverse movement relative to such a document and along each such line of data, drive means for moving such a document longitudinally relative to said scanning head, said drive means including friction drive roller means for engaging and moving such a document, a motor, means for drivingly connecting said motor to said roller means, and control means for said motor, the improvement in which said motor is a stepper motor having an output shaft which is advanced one step about its axis each time said motor is pulsed and including a plurality of coils which are sequentially energized to move said motor output shaft each step, said control means including a ring counter having a plurality of outputs associated respectively with said coils, a driver for connecting each ring counter output to its associated motor coil and means for generating motor energizing pulses including an oscillator for producing pulses at a first predetermined frequency, a divider circuit for receiving such pulses and providing an output of pulses at a second and lower frequency, and a speed selector circuit for selecting which of said first and second frequency pulses is to be fed to said motor, said selector circuit being operatively connected to said oscillator and said divider circuit, and optical means for detecting lines of data on such a document and stopping longitudinal movement of such document, said optical means being operatively connected to said generating means and effective to control the pulse output of said generating means.

13. In a document feeding system including friction drive roller means for engaging the document and moving its longitudinally, a motor drivingly connected to said driver roller means, and control means for said motor, the improvement in which said motor is a stepper motor having an output shaft which is advanced one angular step about its axis each time said motor is pulsed, said control means including generating means for providing pulses at a first predetermined frequency and pulses at a second and lower frequency and a speed selector circuit for selecting which of said first and second frequency pulses are to be fed to said motor, means for projecting light at such a document, optical means defining a field of view on the document, and light-responsive means for providing an output each time said field of view crosses one of a plurality of longitudinally spaced apart marks on the document, said light-responsive means being operatively connected to said pulse generating means and effective to control the output of said generating means.

14. The improvement of claim 13 in which said light-responsive means is connected to said selector circuit and effective to switch said selector circuit to said second and lower frequency pulses when said field of view crosses the leading edge of such a mark on the document.

15. The improvement of claim 14 in which said control means includes means responsive to the output of said light-responsive means to stop the pulsing of said motor and thereby to stop the longitudinal movement of said document when said field of view crosses the trailing edge of such a mark on the document.

* * * * *

UNITED STATES PATENT OFFICE
CERTIFICATE OF CORRECTION

Patent No. 3,946,205      Dated March 23, 1976

Inventor(s) Leland A. Melugin & Joseph Parchesky

It is certified that error appears in the above-identified patent and that said Letters Patent are hereby corrected as shown below:

Column 1, line 8, change "electrooptical" to
--electro-optical--.

Column 1, line 15, after "3,857,020" insert
--issued December 24, 1974--.

Column 1, line 40, change "longitudihally" to
--longitudinally--.

Column 4, line 24, second occurrence, change "input" to --inputs--.

Column 4, line 16, after "operative" insert --,--.

Column 5, line 56, change "224" to --244--.

Column 6, line 2, change "as" to --a--.

Column 6, line 59, change "thereto" to --hereto--.

Column 6, line 59, after "14" insert --,--.

Column 7, line 66, change "a out" to --about--.

Column 9, line 8, change "pulse" to --pulsed--.

Column 9, line 28, change "and" to --an--.

Column 10, line 23, change "its" to --it--.

Column 10, line 24, change "driver" to --drive--.

Signed and Sealed this fifteenth Day of June 1976

[SEAL]

Attest:

RUTH C. MASON
*Attesting Officer*

C. MARSHALL DANN
*Commissioner of Patents and Trademarks*